(No Model.)
R. C. ANDERSON & F. WINTERHALTER.
CAN SOLDERING MACHINE.
No. 294,428. Patented Mar. 4, 1884.
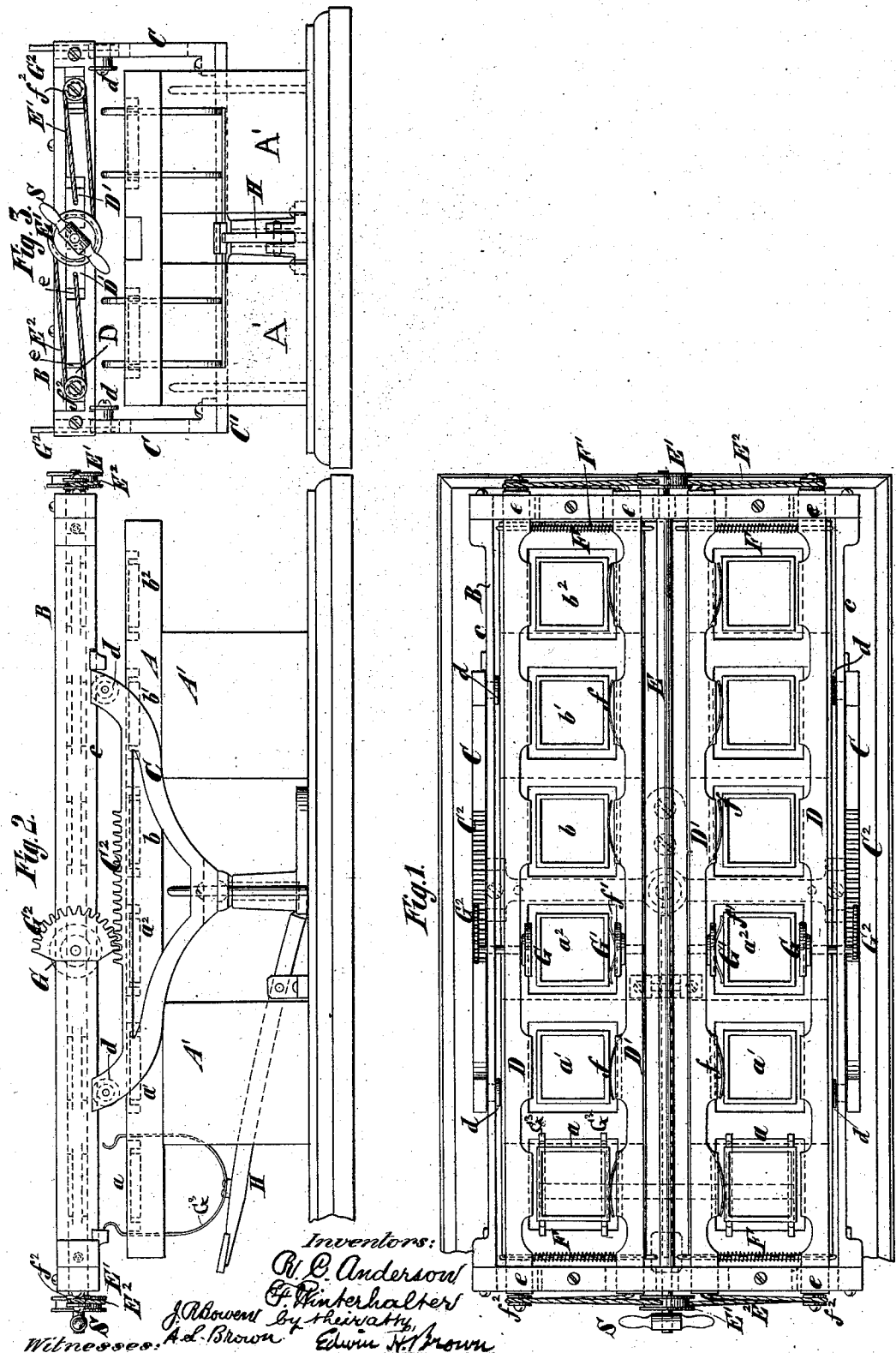

UNITED STATES PATENT OFFICE.

ROBERT C. ANDERSON, OF BAYONNE, AND FREDRICK WINTERHALTER, OF BERGEN POINT, NEW JERSEY.

CAN-SOLDERING MACHINE.

SPECIFICATION forming part of Letters Patent No. 294,428, dated March 4, 1884.

Application filed February 5, 1883. (No model.)

*To all whom it may concern:*

Be it known that we, ROBERT C. ANDERSON, of Bayonne, in the county of Hudson and State of New Jersey, and FREDRICK WINTERHALTER, of Bergen Point, in the county of Hudson and State of New Jersey, have invented a certain new and useful Improvement in Machines for Soldering Cans, of which the following is a specification.

This improvement consists in certain combinations of parts in a machine wherein a traveling carriage takes the cans from acid-receptacles to solder-receptacles, and thence to cooling-receptacles, finally delivering them with the heads soldered to the bodies.

In the accompanying drawings, Figure 1 is a plan of a machine embodying our invention. Fig. 2 is a side view of the same. Fig. 3 is an end view of the same.

Similar letters of reference designate corresponding parts in all the figures.

A designates the bed of the machine. It is erected on standards A', and is provided with receptacles $a$ for acid, receptacles $a'$ for solder, and receptacles $a^2$ for cooling the solder. These receptacles are arranged side by side in pairs, so that two cans may be operated upon side by side. The receptacles are of a shape to suit the shape of the cans to be soldered. The receptacles $a$ are for containing acid suitable for preparing the cans for the solder, and the receptacles $a'$ are for containing melted solder. The cans with the heads upon them are inserted in the acid contained in the receptacles $a$, and are then lifted out and inserted in the solder in the receptacles $a'$, and are subsequently lifted out of the solder and inserted in the receptacles $a^2$. These receptacles $a^2$ are furnished with wet cloths for cooling the solder. The cans are then turned upside down and inserted in acid-receptacles $b$, solder-receptacles $b'$, and cooling-receptacles $b^2$, which are arranged in the bed, and are similar to the receptacles $a$ $a'$ $a^2$. Both heads are thus soldered to the can-bodies.

Any suitable means for keeping the solder heated while in the solder-receptacles may be employed, and means may also be employed for circulating water through the cooling-receptacles, if desirable.

B designates a carriage provided on the under sides with grooves or tracks $c$, which fit upon rollers $d$, mounted in frames C, which are arranged on opposite sides of the bed A, and connected by a cross-bar, C', extending beneath the bed. Within this carriage are two pairs of gripping-bars, D D', arranged approximately opposite the sides of the receptacles $a$ $a'$ $a^2$ $b$ $b'$ $b^2$. They are supported in bearings $e$ in the ends of the carriage, and are capable of being moved toward or from one another to grip or release the can-bodies. One bar of each pair—say, for instance, the bar D'—is preferably provided at regular intervals with spring-fingers $f$, which impinge upon the can-bodies with a yielding action, and hence obviate the danger of crushing the can-bodies, which might occur if both bars acted directly upon the can-bodies.

E designates a rock-shaft extending lengthwise of the carriage and supported in bearings in the ends of the carriage. To the ends are affixed pulleys E', having attached to them cords or bands $E^2$, which extend around pulleys $f^2$ on the ends of the bars D, and are fastened at the ends to the bars D'. At one end the rock-shaft is furnished with a handle, S, whereby it may be conveniently turned. When it is turned in one direction, the cords are wound up on the pulleys E', and the bars of the pairs are drawn together. Springs F are interposed between the bars of each pair, and are coiled around rods F', which extend between and are supported by the bars. Each pair of bars is provided with rotary clamping-pieces G G'. The clamping-pieces G' are loosely journaled in the bars D', and are free to rotate. They are provided with spring-fingers $f'$ for impinging against the can-bodies. The clamping-pieces G are journaled in the bars D, and also in the sides of the carriage. At the outer ends of their journals are toothed sectors $G^2$, which engage with toothed racks $C^2$ on the frames C, and, as the carriage travels, derive motion therefrom. A lever, H, fulcrumed between the ends, is connected at one end to the cross-bar C', whereby the frames C are united, and at the other end it is provided with a foot-piece, whereby it may be actuated.

$G^3$ designates guide-rods, which work up through the bed A and serve to guide the cans into proper position upon the acid-receptacles $a$. These guide-rods are connected to a cross-piece, which is attached to the lever H between its fulcrum and the foot-piece. The movements of the carriage are limited by means of pins which extend from it and are adapted to make contact with the ends of one of the frames C. It can move only the distance between one pair of the receptacles in the bed and the next pair. When the lever H is in its normal position, the guide-rods project upward close to the acid-receptacles a. After the cans have been acted upon by the acid, the operator turns the rock-shaft E, so as to cause the bars D D' to clamp the cans. While holding the handle, he presses his foot upon the foot-piece of the lever H, and thereby raises the frames C and the carriage B. The cans are thereby raised clear of the acid-receptacles a. Still holding the handle, he pushes the carriage forward as far as it will go, and then releases the lever H, to allow the carriage to descend, and releases the bars D D', to free the cans and leave them in the solder-receptacles a'. The carriage, while in its lowermost position, is then drawn back, and two more cans are placed in the acid-receptacles a. The same operation is then repeated, whereupon the first cans are removed from the solder-receptacles a' and inserted into the cooling-receptacles $a^2$, and the second cans are removed from the acid-receptacles a to the solder-receptacles a'. The carriage having been moved back, a third pair of cans is inserted in the acid-receptacles a, and the operation is again repeated, the cans all being shifted to the next pair of receptacles. At this operation the first cans are gripped by the clamping-pieces G G', and, owing to the rotary movement which the clamping-pieces G derive from the travel of the sectors $G^2$ over the racks $C^2$, these cans are turned upside down and inserted into the acid-receptacles b. At the next operation they are inserted into the solder-receptacles b', and finally into the cooling-receptacles $b^2$. They are subsequently removed from the machine. The other pairs of cans are carried forward in the same way, and an additional pair of cans is inserted in the acid-receptacles a before each forward operation of the carriage.

What we claim as our invention, and desire to secure by Letters Patent, is—

1. In a machine for soldering cans, a bed containing a series of receptacles, a carriage, devices upon the carriage for gripping cans, means for releasing the gripping devices, supports whereon the carriage may be reciprocated forward and backward above said receptacles, and means whereby said supports may be raised and lowered for the purpose of raising and lowering the carriage, all being so combined and organized that cans arranged in the receptacles may be gripped by the gripping devices on the carriage, that the carriage may be raised for the purpose of taking the cans out of the receptacles, that the carriage may then be moved forward to bring the cans over receptacles in advance of those from which they were taken, and that the carriage may be subsequently lowered, the gripping devices released from the cans, and the carriage moved back to its original position, substantially as specified.

2. In a machine for soldering cans, a bed containing a series of receptacles, a carriage, devices upon the carriage for gripping cans, and rotary clamps carried by said gripping devices, means for releasing said gripping devices and for rotating said clamps, supports whereon the carriage may be reciprocated forward and backward above said receptacles, and means whereby said supports may be raised and lowered for the purpose of raising and lowering the carriage, all being so combined and organized that cans arranged in the receptacles may be gripped by the said gripping devices, that the carriage may be raised for the purpose of lifting the cans out of the receptacles, that the carriage may then be moved forward to bring the cans over receptacles in advance of those from which they were taken, that the carriage may be subsequently lowered, the gripping devices released from the cans, and the carriage moved back to its original position, and that the rotary clamps, after the soldering of the cans at one end, may be turned during the forward movements of the carriage to reverse the cans end for end, substantially as specified.

3. The combination, with a bed, A, provided with a series of receptacles, of a carriage, B, bars D D', and means for operating the latter, substantially as specified.

4. The combination, with a bed, A, provided with a series of receptacles, of a carriage, B, bars D D', spring-fingers f, and means for operating the bars, substantially as specified.

5. The combination, with a bed, A, provided with a series of receptacles, of a carriage, B, bars D D', the rock-shaft E, pulleys E', cords or bands $E^2$, and pulleys $f^2$, substantially as specified.

6. The combination, with a bed, A, provided with a series of receptacles, of a carriage, B, the bars D D', the frames C C, and the lever H, substantially as specified.

7. The combination, with a bed, A, of a carriage, B, the bars D D', means for causing the bars to grip cans, the clamping-pieces G G', and means for rotating the latter, substantially as specified.

8. The combination, with a bed, A, of a carriage, B, the bars D D', means for causing the bars to grip cans, the clamping-pieces G G', the sectors $G^2$, and the racks $C^2$, substantially as specified.

9. The combination, with a bed containing a series of receptacles, of a carriage adapted to travel along the said bed, means for gripping cans, guide-rods for the cans, and means for raising the carriage and simultaneously depressing the guide-rods, substantially as specified.

ROBT. C. ANDERSON.

Witnesses:
T. J. KEANE,
FREDRICK WINTERHALTER.
JAMES R. BOWEN.